(12) United States Patent
Smith et al.

(10) Patent No.: US 9,199,380 B2
(45) Date of Patent: Dec. 1, 2015

(54) ACOUSTIC PROXIMITY SENSING

(71) Applicant: University of Washington through its Center for Commercialization, Seattle, WA (US)

(72) Inventors: Joshua R. Smith, Seattle, WA (US); Liang-Ting Jiang, Kirkland, WA (US)

(73) Assignee: University of Washington through its Center for Commercialization, Seattle, WA (US)

( * ) Notice: Subject to any disclaimer, the term of this patent is extended or adjusted under 35 U.S.C. 154(b) by 233 days.

(21) Appl. No.: 13/663,355

(22) Filed: Oct. 29, 2012

(65) Prior Publication Data

US 2013/0158711 A1 Jun. 20, 2013

Related U.S. Application Data

(60) Provisional application No. 61/552,603, filed on Oct. 28, 2011.

(51) Int. Cl.
*G01S 11/00* (2006.01)
*G01S 3/80* (2006.01)
*B25J 9/16* (2006.01)
*G01S 1/72* (2006.01)
*G01S 11/14* (2006.01)

(52) U.S. Cl.
CPC .............. *B25J 9/1694* (2013.01); *B25J 9/1612* (2013.01); *B25J 9/1697* (2013.01); *G01S 1/72* (2013.01); *G01S 11/14* (2013.01); *G05B 2219/37433* (2013.01); *G05B 2219/39466* (2013.01); *Y10S 901/46* (2013.01); *Y10S 901/47* (2013.01)

(58) Field of Classification Search
USPC ......................................................... 367/124
See application file for complete search history.

(56) References Cited

U.S. PATENT DOCUMENTS

| | | | | |
|---|---|---|---|---|
| 4,305,141 | A * | 12/1981 | Massa | 367/105 |
| 5,168,474 | A * | 12/1992 | Parra | 367/124 |
| 7,003,099 | B1 * | 2/2006 | Zhang et al. | 379/406.03 |
| 7,158,647 | B2 * | 1/2007 | Azima et al. | 381/152 |
| 7,519,186 | B2 * | 4/2009 | Varma et al. | 381/94.7 |
| 8,401,513 | B2 * | 3/2013 | Langereis et al. | 455/401 |
| 2004/0213419 | A1 * | 10/2004 | Varma et al. | 381/92 |

(Continued)

OTHER PUBLICATIONS

Ashmead, D.H., and R.S. Wall, "Auditory Perception of Walls Via Spectral Variations in the Ambient Sound Field," Journal of Rehabilitation Research & Development 36(4):313-322, Oct. 1999.

(Continued)

*Primary Examiner* — James Hulka
(74) *Attorney, Agent, or Firm* — Christensen O'Connor Johnson Kindness PLLC

(57) ABSTRACT

An acoustic pretouch sensor or proximity sensor (110) includes a cavity (104) with a first microphone (106) disposed therein, and optionally a second microphone (108) disposed outside of the cavity. A processing system (110) receives the signals generated by the first microphone and analyzes the spectrum to produce a result representing the resonant frequency of the cavity. The processing system may optionally subtract the second microphone signal spectrum from the first to automatically compensate for changes in ambient noise. The processing system uses the resonant frequency to estimate the distance from the cavity opening to a surface (90). For example, the pretouch sensors may be incorporated into a stand alone device (100), into a robotic end effector (204), or into a device such as a phone (300).

33 Claims, 5 Drawing Sheets

(56) References Cited

U.S. PATENT DOCUMENTS

| | | | |
|---|---|---|---|
| 2005/0147273 A1* | 7/2005 | Azima et al. | 381/431 |
| 2005/0221867 A1* | 10/2005 | Zurek et al. | 455/569.1 |
| 2008/0116903 A1* | 5/2008 | Koerber | 324/635 |
| 2008/0284617 A1* | 11/2008 | Kim et al. | 340/932.2 |
| 2010/0080084 A1* | 4/2010 | Chen et al. | 367/118 |
| 2010/0103776 A1* | 4/2010 | Chan | 367/119 |
| 2010/0106440 A1* | 4/2010 | Richmond | 702/71 |
| 2010/0256814 A1* | 10/2010 | Smith | 700/259 |
| 2011/0003614 A1* | 1/2011 | Langereis et al. | 455/550.1 |
| 2012/0263019 A1* | 10/2012 | Armstong-Muntner | 367/118 |

OTHER PUBLICATIONS

Hsiao, K., et al., "Reactive Grasping Using Optical Proximity Sensors," IEEE International Conference on Robotics and Automation (ICRA 2009), Kobe, Japan, May 12-17, 2009, 8 pages.

Jiang, L.-T., and J.R. Smith, "Pretouch Sensing for Manipulation," RSS Workshop: Beyond Laser and Vision: Alternative Sensing Techniques for Robotic Perception, Robotics: Science and Systems Conference (RSS 2012), Sydney, Jul. 11-12, 2012, 4 pages.

Jiang, L.-T., and J.R. Smith, "'Seashell Effect' Pretouch for Robot Grasping," PR2 (Personal Robotics) Workshop at the IEEE/RJS International Conference on Intelligent Robots and Systems (IROS '11), San Francisco, Sep. 25-30, 2011, 2 pages.

Jiang, L.-T., and J.R. Smith, "Seashell Effect Pretouch Sensing for Robotic Grasping," IEEE International Conference on Robotics and Automation (ICRA 2012), St. Paul, Minn., May 14-18, 2012, 8 pages.

Mayton, B., et al., "Electric Field Pretouch: Towards Mobile Manipulation," RSS Workshop: Mobile Manipulation in Human Environments, Robotics: Science and Systems Conference (RSS 2009), Seattle, Jun. 28-Jul. 1, 2009, 8 pages.

Ashmead, D.H., et al., "Echolocation Reconsidered: Using Spatial Variations in the Ambient Sound Field to Guide Locomotion," Journal of Visual Impairment & Blindness 92(9):615-632, Sep. 1998.

Brook, P., et al., "Collaborative Grasp Planning With Multiple Object Representations," Proceedings of the IEEE International Conference on Robotics and Automation (ICRA2011), Shanghai, May 9-13, 2011, pp. 2851-2858.

Dalmont, J.-P., et al., "Radiation Impedance of Tubes With Different Flanges: Numerical and Experimental Investigations," Journal of Sound and Vibration 244(3):505-534, Jul. 2001.

"FAQ: Kinect Technical Specifications," MSXbox-World.com, as early as Jun. 2011, <http://www.msxbox-world.com/xbox360/kinect/faqs/305/kinect-technical-specifications.html> [retrieved Mar. 13, 2015].

Hsiao. K., et al., "Bayesian Grasp Planning," Proceedings of the IEEE International Conference on Robotics and Automation (ICRA2011), Workshop on Mobile Manipulation: Integrating Perception and Manipulation, Shanghai, May 9-13, 2011, 8 pages.

Hsiao. K., et al., "Contact-Reactive Grasping of Objects With Partial Shape Information," Proceedings of the IEEE/RSJ International Conference on Intelligent Robots and Systems, Oct. 18-22, 2010, Taipei, pp. 1228-1235.

Jacobsen, E., and P. Kootsookos, "Fast, Accurate Frequency Estimators," IEEE Signal Processing Magazine 24(3):123-125, May 2007.

Kalman, R.E., "A New Approach to Linear Filtering and Prediction Problems," Journal of Basic Engineering 82(D):35-45, Mar. 1960.

Mayton, B., et al., "An Electric Field Pretouch System for Grasping and Co-Manipulation," Proceedings of the IEEE International Conference on Robotics and Automation (ICRA2010), Anchorage, Alaska, May 3-8, 2010, pp. 831-838.

Petrovskaya, A., and O. Khatib "Global Localization of Objects via Touch," IEEE Transactions on Robotics 27(3):569-585, Jun. 2011.

Petrovskaya, A., et al., "Bayesian Estimation for Autonomous Object Manipulation Based on Tactile Sensors," Proceedings of the IEEE International Conference on Robotics and Automation (ICRA2006), Orlando, Flordia, May 15-19, 2006, pp. 707-714.

Petrovskaya, A., et al., "Touch Based Perception for Object Manipulation," Proceedings of the IEEE International Conference on Robotics and Automation (ICRA2007), Rome, Apr. 10-14, 2007, 6 pages.

"Ping))) Ultrasonic Sensor," Parallax Inc., Rocklin, Calif., at least as early as May 2009, <http://www.parallax.com/tabid/768/ProductID/92/Default.aspx> [retrieved Mar. 13, 2015].

Platt, R., Jr., et al., "Null-Space Grasp Control: Theory and Experiments," IEEE Transactions on Robotics 26(2):282-295, Apr. 2010.

Romano, J.M., et al., "Human-Inspired Robotic Grasp Control With Tactile Sensing," IEEE Transactions on Robotics 27(6):1067-1079, Dec. 2011.

Rusu, R.B., and S. Cousins, "3D Is Here: Point Cloud Library (PCL)," ICRA Communications, Proceedings of the IEEE International Conference on Robotics and Automation (ICRA2011), Shanghai, China, May 9-13, 2011, 4 pages.

"Scanning Range Finder (SOKUIKI Sensor): UTM-30LX," © 2009 HOKUYO Automatic Co., Ltd., Osaka, Japan, <http://www.hokuyo-aut.jp/02sensor/07scanner/utm_30lx.html> [retrieved Apr. 9, 2015].

Wistort, R., and J.R. Smith, "Electric Field Servoing for Robotic Manipulation," Proceedings of the IEEE/RSJ International Conference on Intelligent Robots and Systems, Nice, France, Sep. 22-26, 2008, pp. 494-499.

* cited by examiner

ACOUSTIC PROXIMITY SENSING

CROSS-REFERENCE TO RELATED APPLICATION

This application claims the benefit of Provisional Application No. 61/552,603, filed Oct. 28, 2011, the entire disclosure of which is hereby incorporated by reference herein.

BACKGROUND

Long range non-contact sensors such as RGB cameras, depth cameras, and laser scanners are widely used, for example in robotics for object recognition and pose estimation. One application for these relatively long range sensors is to obtain data for robotic grasp planning prior to manipulation. Contact sensors such as tactile pressure sensors are commonly used during the process of manipulation to provide force feedback information to a grasp controller.

The acoustic proximity sensor disclosed herein is a type of "pretouch" sensor. Pretouch sensors are non-contact sensors suitable for use to detect close proximity to an object, e.g., at a range that is shorter than optical devices but longer than contact-based tactile sensing. A novel pretouch or proximity sensor, sometimes called a "seashell effect pretouch sensor" has been found to work for close range proximity sensing on a wide variety of materials. For example, the seashell effect pretouch sensor may be used for both grasp control and grasp planning in robotic systems. They may also be used in a non-optical, non-contact system for obtaining three dimensional data for an object.

Pretouch sensing is beneficial for robotic manipulation because it provides reliable geometric information in the last centimeter before contact. A disadvantage of tactile sensing for collecting local geometric information is that contacting the object may displace and/or deform the object. Pretouch sensing may be implemented in a manner that is not subject to problems associated with the manipulator device occluding the camera. The pretouch sensor may be integrated directly into the end effector of a robotic manipulator. Similarly, there are typically no camera-to-hand registration errors because the sensor is in the coordinate frame of the hand. A further distinction between pretouch sensing and depth sensing technologies is that the latter typically fail below some minimum distance.

Compared to tactile sensing, one can think, of a pretouch sensor as a sensor that detects surface proximity, but has no lower limit on detectable force, and thus is able to sense arbitrarily compliant objects.

A pretouch sensor that relies on electric field sensing is disclosed in U.S. Patent Application Publication No. US 2010/0256814, which is hereby incorporated by reference in its entirety. Electric field pretouch sensing has many desirable properties, but typically rely on the properties of materials that are conductive or have high dielectric constant. Optical pretouch depends on surface albedo, and thus fails in some of the same cases as the long range vision sensors: transparent or specular objects. Thus optical pretouch sensors may fail to complement the longer range 3D visual sensors used to plan grasps because they both rely on similar physical phenomena. Optical pretouch sensors and 3D visual sensors are therefore likely to fail in a correlated fashion. Seashell effect pretouch sensors such as those disclosed herein have the desirable characteristics of pretouch sensing systems using other technologies, but do not depend on electrical or optical material properties. Thus seashell effect (acoustic) pretouch sensors work on materials that are difficult for electric field pretouch, optical pretouch, and conventional vision/depth sensors.

SUMMARY

This summary is provided to introduce a selection of concepts in a simplified form that are further described below in the Detailed Description. This summary is not intended to identify key features of the claimed subject matter, nor is it intended to be used as an aid in determining, the scope of the claimed subject matter.

An acoustic pretouch sensor or proximity sensor is disclosed that uses changes in the resonance frequency of a cavity to estimate to distance between the opening, of the cavity and a surface.

In an embodiment the acoustic proximity sensor includes a first microphone located in a cavity and optionally a second microphone located outside of the cavity. One or both of the microphones may be electret microphones. A processing system is configured to receive signals from the first microphone and optionally the second microphone, to analyze the signals to estimate a resonant frequency of the cavity, and uses the resonant frequency to estimate the distance from the cavity to a surface. For example, the sensor may be operable in the range of 0-10 mm.

In an embodiment the processing system amplifies and digitizes the first and second signals, estimates the respective power spectrums, and subtracts the second signal spectrum from the first signal spectrum. The spectrums may be estimated, for example, using Welch's method, Bartlett's method, or the like. The differenced spectrum may then be filtered, for example with a Kalman filter. In an embodiment the sensor is a passive device, relying only on ambient noise.

In another aspect of the invention, a robotic manipulator having a base and a finger with an end effector connected to the base includes an acoustic pretouch sensor. The acoustic pretouch sensor includes a first microphone disposed in a cavity, and a second microphone disposed outside of the cavity. A processing system is configured to receive a cavity signal from the first microphone and a reference signal from the second microphone. The signals are analyzed to estimate the resonant frequency of the cavity, which may be affected by the proximity of a surface. The resonant frequency is then used to estimate the distance to a surface.

DESCRIPTION OF THE DRAWINGS

The foregoing aspects and many of the attendant advantages of this invention will become more readily appreciated as the same become better understood by reference to the following detailed description, when taken in conjunction with the accompanying drawings, wherein.

DETAILED DESCRIPTION

There is a well-known folk myth that if one holds a seashell to the ear, one can hear the sound of the ocean. The rushing sound is in fact the noise of the surrounding environment resonating within the cavity of the shell. The same effect can be produced with any resonant cavity. The resonator is simply amplifying the ambient environmental noise in a frequency dependent fashion that is determined by the resonant modes of the specific cavity. It is easily verified that the perceived sound depends on the position of the seashell with respect to the head. Inspired by this seashell effect, we propose to measure the distance to nearby objects by detecting changes in the ambient noise spectrum inside an acoustic cavity. For example, a cavity with a microphone is integrated into a robot finger; as the finger approaches a surface, the spectrum of the noise collected by the microphone changes. We have found that changes in the collected spectrum ma be analyzed and correlated to the distance between the cavity opening and the surface.

Robotic grasping in unstructured human environments is a challenging problem for robotics. A key difficulty is the lack of reliable perception data, which may simply be the result of limitation of conventional proximity sensors. Depth sensing camera systems, including textured stereo cameras and structured infrared depth cameras, have dramatically improved recently. However, these sensors frequently fail to provide suitable point cloud information, because of geometric difficulties (such as occlusion), material difficulties (transparency or secularity), or the like. An acoustic pretouch or proximity sensor is disclosed that may be used to generate suitable point cloud data or to augment point cloud data provided by depth cameras, with the aim of improving the grasps that can be planned for an object. The disclosed acoustic proximity sensor will have other uses apparent to persons of skill in the art. In one example discussed below an acoustic proximity detector in accordance with the present invention is used to detect when a cell phone is near a user's head.

The acoustic proximity sensor disclosed herein takes advantage of the fact that the resonant frequency of a cavity will change as the open end of the cavity approaches a surface. A detailed discussion of the acoustic theory underlying the acoustic proximity sensor can be found in "Radiation impedance of tubes with different flanges: numerical and experimental investigations," J. P. Dalmont, C. J. Nederveen, N. Joly, *J. Sound and Vibration*, Vol. 244(3), pp. 505-534, 2001, which is hereby incorporated by reference.

Figure 1:
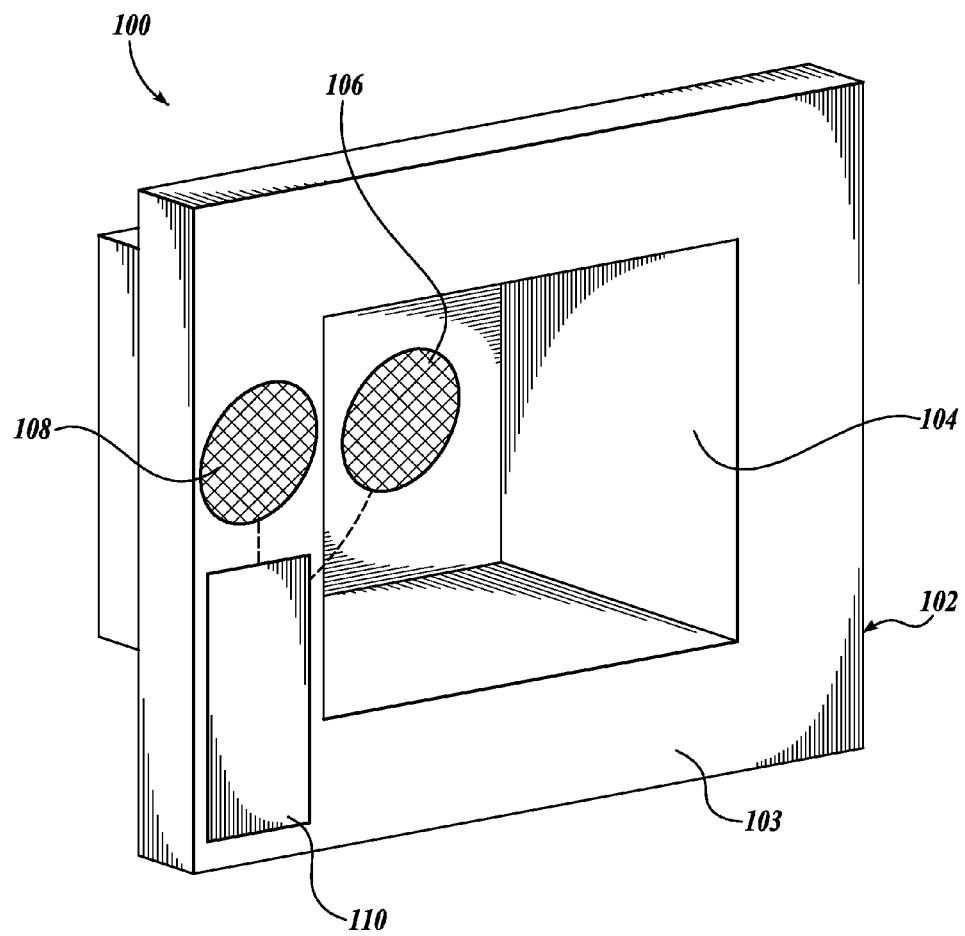
FIG. 1 illustrates an acoustic proximity sensor, or pretouch sensor, in accordance with the present invention.
Figure 2:
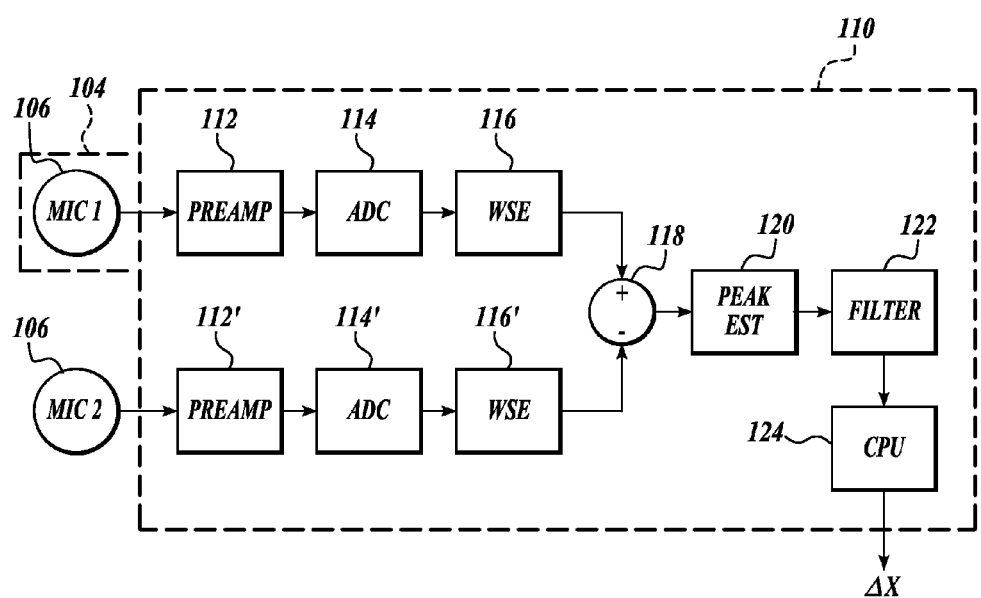
FIG. 2 is a block diagram illustrating an exemplary signal processing system for the acoustic proximity sensor shown in FIG. 1.

A simplified drawing of a proximity sensor 100 in accordance with the present invention is shown in FIG. 1. In this embodiment the sensor 100 includes a housing 102 defining a cavity 104 having an open end. A first microphone 106 is disposed inside the cavity 104, and a second microphone 108 is disposed outside the cavity 104, for example on a face 103 of the housing 102. The first and second microphones 106, 108 are operatively in communication with a processing system 110 that is configured to receive and analyze the signals detected by the first and second microphones 106, 108. Although the cavity 104 is illustrated as rectangular, it is contemplated that the cavity may be of any shape. For example in a current embodiment a substantially cylindrical cavity is used for a pretouch sensor. Alternatively, an elongate circuitous cavity, for example. A more detailed block diagram of the sensor 100 is shown in FIG. 2.

The cavity 104 amplifies ambient noise preferentially in a certain frequency response, e.g., the resonant frequency of the cavity 104. The sound in the cavity 104 is collected by the first microphone 106. For example, in as current embodiment the first microphone is an omni-directional electret condenser microphone cartridge with a sampling rate ($F_S$) of 44,100 Hz. The cavity signal from the first microphone 106 is amplified in a preamplifier 112. For example, in a current embodiment the signal is amplified by 50 dB. The amplified signal is then digitized with an analog-to-digital converter (ADC) 114. For the same time period, the second microphone 108 collects the ambient sound outside the cavity 104 to obtain a reference signal. The reference signal is similarly amplified in a preamplifier 112', and digitized with an ADC 114'.

The power spectrum of the cavity signal is estimated 116, and the power spectrum of the reference signal is estimated 116'. For example, in a current embodiment the power spectrum of the signals is estimated every 0.05 second (N=2205) using a spectral density estimation 116, for example Welch's method for spectrum estimation, as is known in the art. Welch's method is an improvement on the standard periodogram spectrum estimating method and on Bartlett's method, all of which use the discrete Fourier transform to compute the periodogram. Other methods for spectrum estimation are known and are also contemplated by the present invention.

The spectrum of the reference signal is subtracted 118 from the spectrum of the cavity signal to produce a subtracted spectrum, before finding the peak power. Therefore, the effect of changes in the ambient noise is removed in the subtracted spectrum. The frequency of the subtracted frequency having maximum power is estimated 120. The maximum power frequency represents a resonance frequency for the cavity 104. Methods for estimating spectral peak frequency are known in the art. See: for example, E. Jacobsen, P. Kootsookos, *Fast, Accurate Frequency Estimations*, IEEE Signal Processing Magazine, Vol. 24(30), pp. 123-125, 2007, which is hereby incorporated by reference in its entirety.

A filter 122 filters the frequency spectral peak to determine a filtered resonance frequency. For example in a current embodiment a Kalman filter is provided with process variance $10^{-5}$ and measurement variance $10^{-4}$ is used. The various design parameters in the current embodiment were experimentally obtained, and attempt to balance the objectives of a fast response time and measurement stability. The filtered spectral peak frequency may then be processed 124 to estimate a distance $\Delta X$ to a surface.

Over a near-field range, the resonant frequency of the cavity 104 will vary monotonically as an object approaches the open end of the cavity 104 (or the cavity 104 approaches a surface). The particular functional dependency can be determined experimentally for a particular cavity configuration. For example, in a current embodiment a lookup table is generated experimentally correlating a filtered resonance frequency with a distance of a surface from the cavity 104 opening. The filtered resonance frequency is provided to a processor 124 which is configured to use the frequency to estimate the distance $\Delta X$ to an object near the opening of the cavity 104. Other options include curve fitting the resonant frequency with distance, or the like.

The particular lookup table or curve fit may depend on the properties of the target object. It is contemplated that different lookup tables may be experimentally obtained tier different target objects. The particular lookup table may then be selected with knowledge of the object, or heuristically. Alternatively, a lookup table ma be selected from contemporaneously obtained data For example, an optical sensor may be provided that overlaps the maximum range of the acoustic proximity sensor 110. The lookup table may then be selected based on obtaining a best fit to the optical sensor data in the overlapping range.

Although a currently preferred embodiment is disclosed that includes a second microphone 108 for generating a reference signal, it will be apparent to persons of skill in the art that the system may alternatively be practiced without an external microphone 108, and without obtaining a reference signal. For example, if the sensor is to be operated in an environment with predictable acoustic characteristics, for example in a quiet MOM or in a room having only known sources of noise, then the signal from the cavity microphone 106 (which preferentially amplifies the resonant frequency of the cavity), may be analyzed without subtracting a reference signal. The cavity signal may be used to estimate a distance from the cavity 104 to a surface without subtracting any reference signal. Alternatively, an external control may be provided that monitors environmental noise, and shuts off or disregards cavity signal data when ambient noise conditions are detected that might result in unreliable results. In this embodiment rather than subtracting a reference signal data, the cavity signal data may be analyzed only for time windows wherein the ambient noise is within a predetermined decibel range or within a predetermined rate of change of the ambient sound characteristics.

Figure 3:
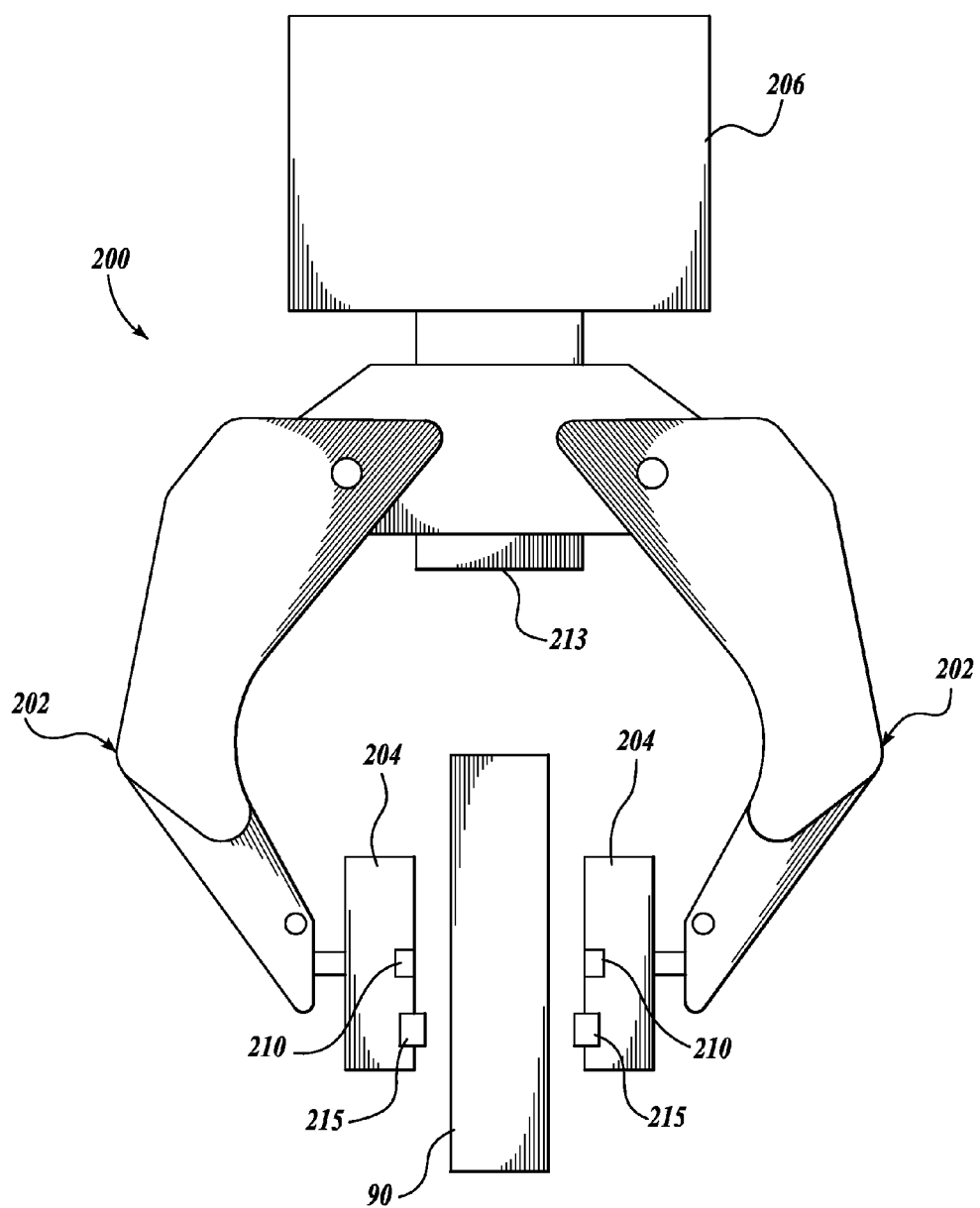
FIG. 3 illustrates a robotic actuator having an acoustic proximity sensor similar to the sensor shown in FIG. 1 integrated into its end effectors.

FIG. 3 illustrates a robot 200 having opposed grasping fingers 202, wherein the end effectors 204 of the fingers 202 are each provided with an acoustic proximity sensor 210 similar to the sensor 100 described above. The processing system 110 may be disposed remotely from the microphones 106,108, but in signal communication therewith.

The robot 200 includes a base 206 for manipulating the position of the plurality of fingers 202. Finger end effectors 204 may be, for example, grippers or tools. The sensors 210 are illustrated built into the end effectors 204 on the surface that engages an object 90. It is also contemplated the sensors 100 may be disposed in the distal end flortion of the end effectors 204 or on an end effector tool, for example to use the robot 200 for obtaining, point cloud information for the object 90. In an exemplary embodiment a cavity 104 is defined having approximately cylindrical with a 2.5 min radius and 5 mm depth. The signal microphone has a thickness of about 3 mm.

In the embodiment of FIG. 3 the base 206 may also be equipped with an optical sensor 213 such as a camera or the like, which may be used for propositioning the fingers 202 to bring the end effectors 210 within an effective range for detecting the object 90. The end effectors 204 may further be provided with additional sensors 215, for example with tactile sensors such as strain gauges.

Figure 4:
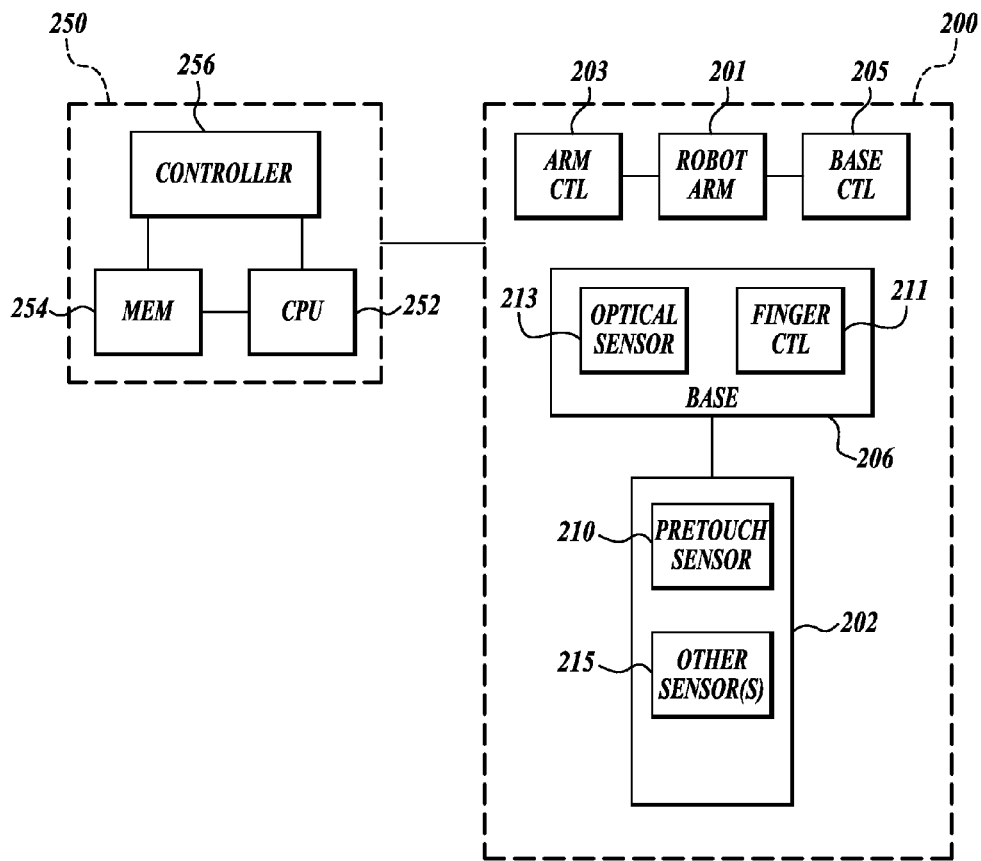
FIG. 4 is a block diagram illustrating components of a robotic system using the robotic actuator illustrated in FIG. 3.

A block diagram for an exemplary embodiment of a robotic arm client 250 in communication with the robot 200 is shown in FIG. 4. The client 250 may be, for example a conventional computer, such as a desktop computer, laptop computer, tablet computer, smart phone, or the like. The client 250 in this embodiment includes a microprocessor 252, suitable memory 254, and a controller module 256 that is configured to interact with the robot 200. The client 250 is in signal communication with the robot 200, which may be accomplished with a direct cable linkage, wirelessly, and/or through a local or global network.

The robot 200 may further comprise an arm 201 for moving the base 206 to a desired location near the object 90, and further includes an arm controller 203, and a base controller 205. The base 206 may include the camera 213, and a controller for the finger 202.

It should be appreciated that effectiveness of the acoustic proximity sensor 210 does not depend on the optical or electrical material properties of the object 90. Instead it depends on the mechanical or acoustic properties of the object 90. For example, the sensor 210 can detect transparent and extremely light-reflective materials, which are difficult for optical sensors to detect. Therefore, it is contemplated that the sensors 210 could advantageously be used in a complementary fashion with longer range optical depth sensors.

The performance of the pretouch or acoustic proximity sensors 210 was evaluated by collecting 1,000 sensor readings (filtered spectral peak frequency) at distances ranging between 1 mm and 1.0 mm. In this embodiment the filtered resonance frequency was found to begin decreasing from 6 mm distance from the object 90. Based on the testing an effective threshold distance was determined. For example, the sensors 210 in an embodiment sere fund to be effective at a maximum distance in the range of 3-6 mm. Other configurations may have greater or lesser maximum distance ranges. For example, the pretouch sensor 210 may have an effective range of 10 mm, or greater.

With pretouch sensors 210 in two (or more) fingers 202 of a robot 200, the robot 200 will be able to grasp extremely compliant and/or delicate objects 90, that may not be detectable to tactile sensors. It is also contemplated that multiple pretouch sensors 210 may be provided on each finger 202 of a robot, to provide additional surface data, for example surface orientation, and the like. Using a plurality of acoustic proximity sensors 210 on an end effector will facilitate a new mode of pretouch point cloud data collection in which the hand moves continuously collecting pretouch data. Because the acoustic proximity sensor 210 is effective at relatively short distances, the sensors may be used to obtain data to generate a complete 3-D model of an object with high fidelity.

Figure 5:
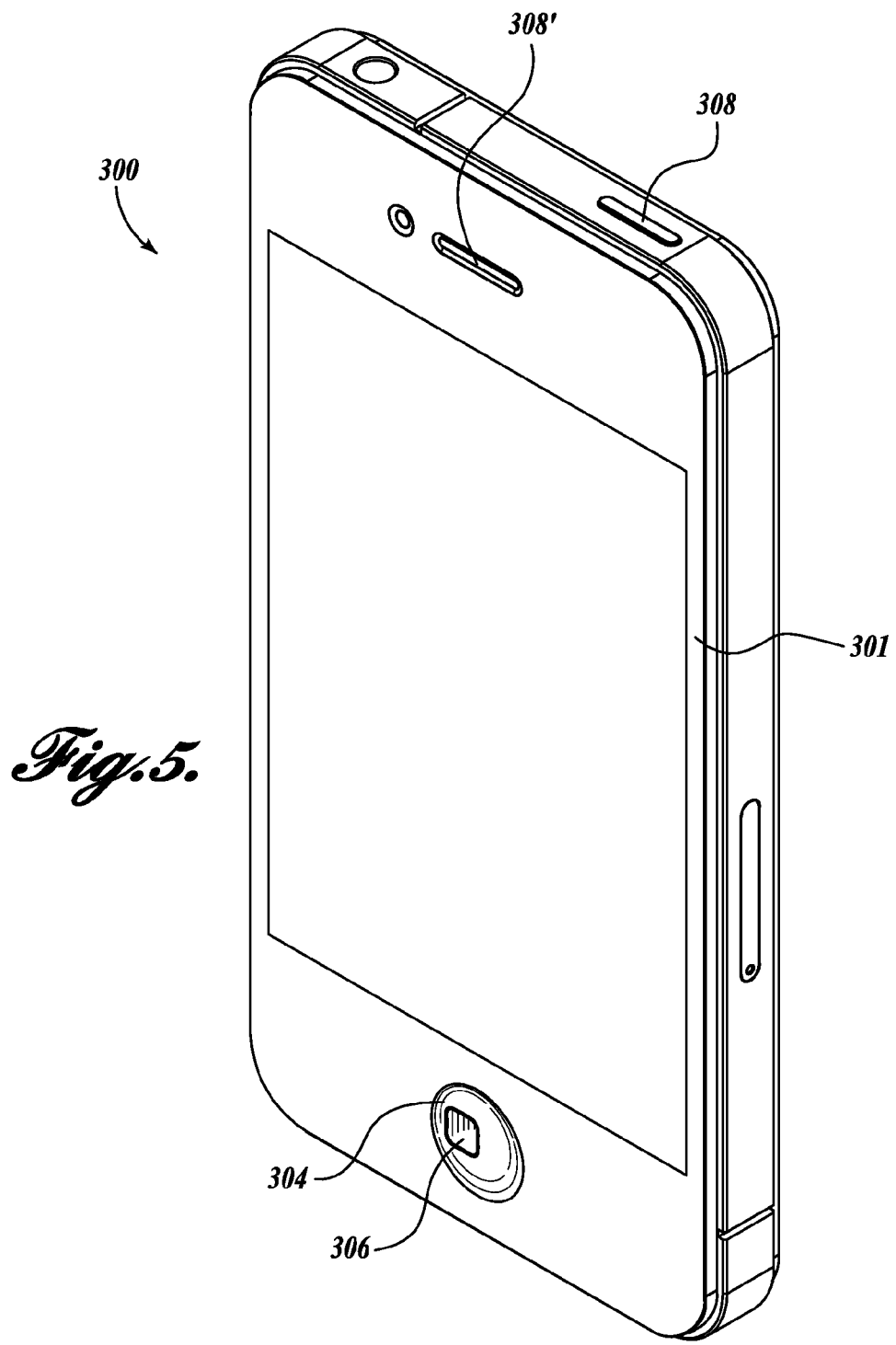
FIG. 5 illustrates a phone application for an acoustic proximity sensor in accordance with the present invention.

Another embodiment of an acoustic proximity sensor in accordance with the present invention is illustrated in FIG. 5. In this embodiment the proximity sensor is incorporated into a telephone, for example a smart phone 300, and is configured to provide a signal when the phone 300 is disposed very near the user's ear or face. The phone 300 is provided with a first microphone 306 disposed in a cavity 304 that is open to the from of the phone 300. Although the cavity 304 and the first microphone 306 are shown near the bottom of the phone 300, it is contemplated that it may be alternatively positioned, for example nearer to the earphone 308', for example if detection of proximity to the user's ear is desired. A second microphone 308 is also incorporated into the phone 300 and may be positioned at a convenient location. Although the second microphone 308 is shown near a top end of the phone 300, it may alternatively be positioned nearer the first microphone 306, for example. In an alternative embodiment, the speaker or earphone 308' of the phone 300 may function as the second microphone. A conventional smart phone 300 includes one or more processors that are capable of calculating the resonant frequency in the cavity 304, and using the resonant frequency to estimate a distance from the user, when the phone 300 is placed near the user's face.

This proximity sensor may then be used to control the operation of the phone 300. For example, the proximity sensor may automatically answer an incoming call or activate a program to detect user vocal commands when the phone 300 approaches the user's ear or face. The phone 300 may adjust the volume of the ring tone generator (not shown) and/or the volume of the earphone 308 based on the distance to the ear. Similarly, the proximity sensor may be used to turn the display off when the phone 300 is ver near the user's ear, to save power.

It will be appreciated that the disclosed acoustic proximity sensor does not rely on generating any tone, but rather uses ambient noise to estimate the resonant frequency in a cavity. Therefore, the present sensor is passive, which is herein defined to mean it may be used without generating a tone or other noise that may be annoying or unpleasant to a user. However, it is contemplated in alternative embodiments, a speaker or tone generator may be incorporated into the sensor, for example to improve the performance of the sensor.

While illustrative embodiments have been illustrated and described, it will be appreciated that various changes can be made therein without departing from the spirit and scope of the invention.

The embodiments of the invention in which an exclusive property or privilege is claimed are defined as follows:

1. An acoustic proximity sensor comprising:
   a housing defining a cavity having a cavity opening;
   a first microphone disposed in the cavity;
   a second microphone disposed outside of the cavity; and
   a processing system configured to receive a first signal from the first microphone and a second signal from the second microphone, and is further configured to analyze the first and second signals to estimate an acoustic resonant frequency of the cavity, wherein the analysis includes estimating a first signal power spectrum for the first signal;
   wherein the processing system is further configured to use the acoustic resonant frequency of the cavity to calculate a distance from the cavity opening to an external surface near the cavity opening.

2. The acoustic proximity sensor of claim 1 wherein the sensor is operable to calculate the distance to the surface in a range of 0-10 mm.

3. The acoustic proximity sensor of claim 1, wherein the first microphone is an electret condenser microphone.

4. The acoustic proximity sensor of claim 1, wherein the first signal corresponds to sound detected in the cavity and the second signal corresponds to ambient noise outside of the cavity.

5. The acoustic proximity sensor of claim 4, wherein the processing system further estimates a second signal power spectrum for the second signal and subtracts the second signal power spectrum from the first signal power spectrum.

6. The acoustic proximity sensor of claim 5, wherein the first and second power spectrums are estimated using one of Welch's method, Bartlett's method, and the periodogram method.

7. The acoustic proximity sensor of claim 5, wherein the processing system comprises a preamplifier that amplifies the first signal and an analog to digital converter that operates on the amplified first signal.

8. The acoustic proximity sensor of claim 5, wherein the differenced spectrums are filtered prior to calculating the distance from the cavity to the surface.

9. The acoustic proximity sensor of claim 1, wherein the sensor is passive.

10. A phone handset comprising an earphone, a user microphone, and a video display, wherein the phone handset further comprises the acoustic proximity sensor of claim 1.

11. The phone handset of claim 10, wherein the acoustic proximity sensor is operable to control a parameter of the video display.

12. The phone handset of claim 10, wherein the user microphone also functions as the first microphone or the second microphone recited in claim 1.

13. An acoustic proximity sensor comprising:
    a substrate having a cavity with a cavity opening;
    a first microphone disposed inside the cavity; and
    a processing system configured to receive a first signal from the first microphone and to analyze the first signal to estimate an acoustic resonant frequency of the cavity, wherein the analysis of the first signal includes calculating a first signal power spectrum for the first signal;
    wherein the processing system is further configured to use the acoustic resonant frequency to calculate a distance from the cavity opening to an external surface near the cavity opening.

14. The acoustic proximity sensor of claim 13, further comprising a second microphone disposed outside the cavity, and wherein the processing system is configured to receive a second signal from the second microphone.

15. The acoustic proximity sensor of claim 14, wherein the processing system further calculates a second signal power spectrum for the second signal and subtracts the second signal power spectrum from the first signal power spectrum.

16. The acoustic proximity sensor of claim 13, wherein the sensor is passive.

17. A robot comprising:
    a base;
    a finger operably connected to the base;
    an end effector attached to the finger and incorporating an acoustic pretouch sensor, wherein the pretouch sensor comprises:
       a first microphone disposed in a cavity having a cavity opening;
       a second microphone disposed outside of the cavity; and
       a processing system configured to receive a first signal from the first microphone and a second signal from the second microphone, to calculate a cavity power spectrum for the first signal, and to use the first and second signals to estimate an acoustic resonant frequency of the cavity;
    wherein the processing system is further configured to use the acoustic resonant frequency to calculate a distance from the cavity opening to an external surface near the cavity opening.

18. The robot of claim 17 wherein the pretouch sensor is operable to calculate the distance to the surface in a range of 0-10 mm.

19. The robot of claim 17, wherein the first microphone is an electret condenser microphone.

20. The robot of claim 17, wherein the first signal corresponds to noise in the cavity and the second signal corresponds to ambient noise outside the cavity.

21. The robot of claim 20, wherein the processing system further calculates a reference signal power spectrum and subtracts the reference signal power spectrum from the cavity signal power spectrum.

22. The robot of claim 21, wherein the processing system amplifies and digitizes the first and second signals prior to calculating the cavity and reference signal spectrums.

23. The robot of claim 22, wherein the differenced spectrums are filtered prior to estimating the distance from the cavity to the surface.

24. The robot of claim 17, wherein the pretouch sensor is passive.

25. The robot of claim 17, further comprising an optical sensor mounted to the base.

26. The robot of claim 17, further comprising a tactile sensor disposed in the end effector.

27. The robot of claim 17, further comprising a second finger attached to the base and having a second end effector, wherein the second end effector incorporates a second pretouch sensor.

28. A method for acoustic pretouch sensing comprising:
    providing an end effector with a first pretouch sensor comprising a cavity having a cavity opening, a first microphone disposed inside the cavity, and a second microphone disposed outside of the cavity;

comparing a cavity acoustic signal generated by the first microphone with a simultaneous reference acoustic signal generated by the second microphone to calculate an acoustic resonant frequency of the cavity, wherein the calculation includes estimating the power spectrum for the cavity acoustic signal; and estimating from the calculated resonant frequency of the cavity a distance from the cavity opening to an external surface near the cavity opening.

29. The method of claim 28, wherein the step of comparing the cavity acoustic signal with the reference acoustic signal comprises amplifying the signals, digitizing the signals, estimating the power spectrum of the signals, and differencing the power spectrums.

30. The method of claim 29, wherein the step of estimating the power spectrum of the signals comprises using Welch's method, Bartlett's method, or the periodogram method.

31. The method of claim 28, wherein the step of estimating the distance from the cavity to the surface comprises using a lookup table that correlates distance with resonant frequency of the cavity.

32. The method of claim 28, further comprising providing a longer range sensor, and using the longer range sensor to preposition the acoustic proximity sensor near the surface.

33. The method of claim 32, wherein the longer range sensor is a camera.

* * * * *